United States Patent

Koyama et al.

[15] 3,644,780

[45] Feb. 22, 1972

[54] STARTING DEVICE FOR DISCHARGE LAMP INCLUDING SEMICONDUCTORS PREHEATING AND STARTING CIRCUITS

[72] Inventors: Shigeo Koyama, Neyagawa-shi; Motohiro Ohtsuki, Nara-shi; Kenji Shimatani, Hirakata-shi; Masao Yasuda, Higashiosaka-shi; Toru Takei, Osaka; Yasutaka Kawai, Higashiosaka-shi; Takeshi Matsushima, Nara-shi, all of Japan

[73] Assignee: Matsushita Electric Industrial Co., Ltd., Osaka, Japan

[22] Filed: Dec. 22, 1969

[21] Appl. No.: 887,053

[30] Foreign Application Priority Data

| | | |
|---|---|---|
| Dec. 27, 1968 | Japan | 44/742 |
| Feb. 6, 1969 | Japan | 44/11130 |
| Feb. 6, 1969 | Japan | 44/11131 |
| Feb. 6, 1969 | Japan | 44/11135 |

[52] U.S. Cl. ..........315/100 U, 315/96, 315/100 T, 315/101, 315/105, 315/106, 315/205, 315/207

[51] Int. Cl. ..........H05b 41/04

[58] Field of Search ..........315/100 T, 100 U, 100 H, 99, 315/101, 103, 105, 106, 107, 205, 206, 207, 266

[56] References Cited

UNITED STATES PATENTS

| | | | |
|---|---|---|---|
| 3,188,490 | 6/1965 | Hoff et al. | 315/194 X |
| 3,307,070 | 2/1967 | Hutson | 315/101 |
| 3,336,501 | 8/1967 | Segawa | 315/105 |
| 3,476,976 | 11/1969 | Morita et al. | 315/101 |

*Primary Examiner*—John Kominski
*Attorney*—Stevens, Davis, Miller & Mosher

[57] ABSTRACT

A discharge lamp starter device which comprises a serial circuit constituted by a reverse blocking diode thyristor or a bilateral diode thyristor and a diode, the breakdown voltage $V_{BO}$ of the thyristor being lower than the rated source voltage but higher than the terminal voltage of a fluorescent discharge tube while the blocking voltage $V_R$ of the thyristor having a sufficiently great value with respect to the breakdown voltage $V_{BO}$, and a pulse generator circuit constituted by a pulse transformer, a capacitor and a bilateral diode thyristor, the two circuits being connected in parallel with the fluorescent discharge tube to thereby instantaneously start the fluorescent discharge tube.

10 Claims, 19 Drawing Figures

STARTING DEVICE FOR DISCHARGE LAMP INCLUDING SEMICONDUCTORS PREHEATING AND STARTING CIRCUITS

This invention relates to a discharge lamp starter device in which a reverse blocking diode thyristor or a bilateral diode thyristor whose blocking voltage $V_R$ has a sufficiently great value with respect to its breakdown voltage $V_{BO}$ is connected in series with a diode, and the serial connection and a pulse voltage generator circuit comprising a pulse transformer, a capacitor and a bilateral diode thyristor are connected in parallel with a fluorescent discharge tube to thereby instantaneously light up the fluorescent discharge tube.

In the discharge lamp starter device according to the prior art, as shown in FIGS. 1 and 2 of the accompanying drawings, a fluorescent discharge tube 1 was connected in parallel either with a manual switch 2 or with a glow starter tube 3 so that the fluorescent discharge tube is lit up. The device using a manual switch required much time for starting the discharge tube, and the device using a glow starter tube required less time for starting the discharge tube but suffered from the problem of a shorter life resulting from the use of the glow starter tube. The known discharge lamp starter devices of FIGS. 1 and 2 further include an AC power source 4, a power switch 5, a ballast 6, and a noise preventing capacitor 7 connected in parallel with the manual switch 2 or with the glow starter tube 3. Another conventional discharge lamp starter device known as the rapid starter system employed a special discharge tube for rapidly lighting the fluorescent discharge tube and, in combination therewith, a special ballast having a cathode preheating winding, a high-voltage generating winding, etc. In this known arrangement, the ballast in use was large in size and the total weight of the entire device was greater, resulting in economical, industrial and various other disadvantages.

It is therefore the primary object of the present invention to provide a novel discharge lamp starter device which can eliminate these disadvantages peculiar to the known discharge lamp starter devices.

The above and other objects and features of the present invention will be fully apparent from the following description taken in conjunction with the accompanying drawings, in which:

FIGS. 1 and 2 show in block diagram the electric circuits of the discharge lamp starter devices according to the prior art;

FIGS. 3 and 3*a* show in block diagram the electric circuit of the discharge lamp starter device according to an embodiment of the present invention;

Figure 9:
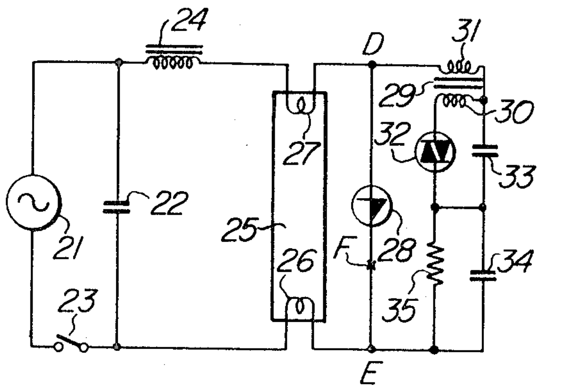
Figure 9A:
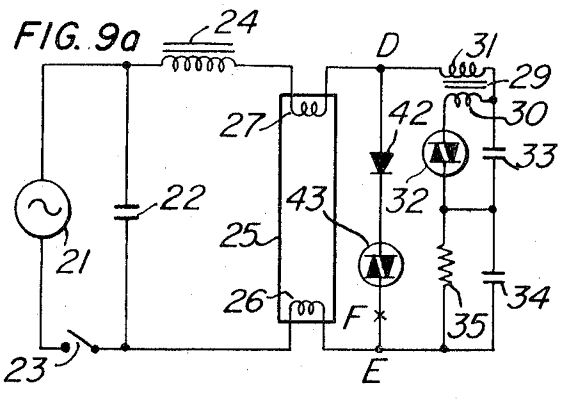
Figure 12A:
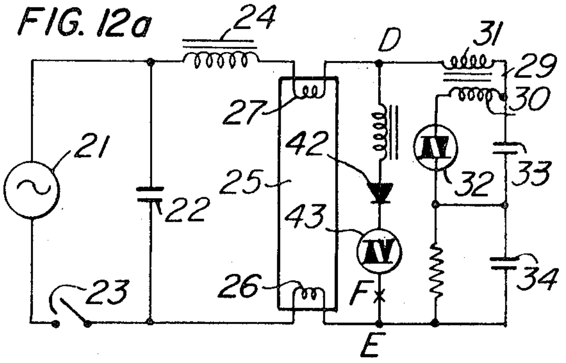
Figure 10:
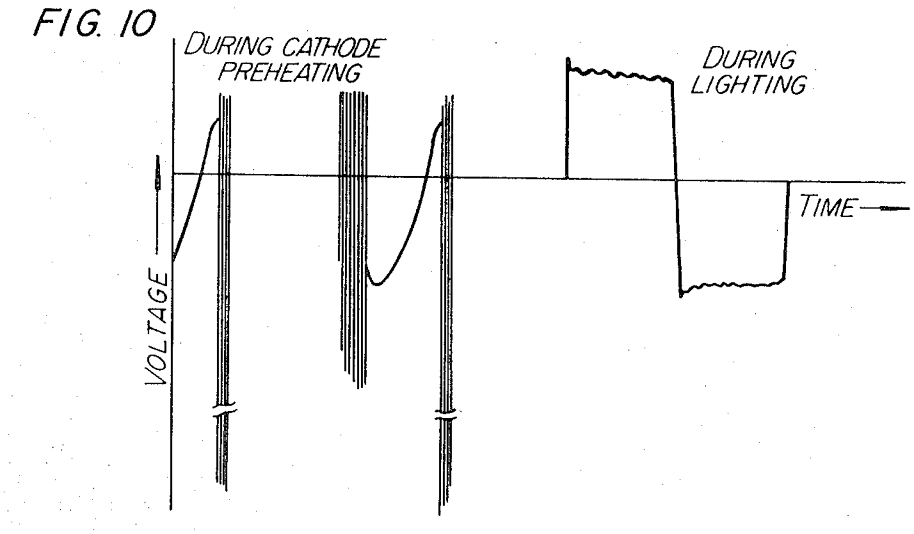
Figure 11:
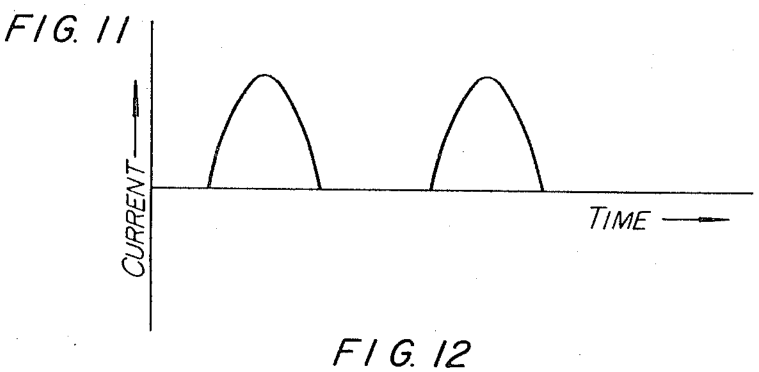
Figure 12:
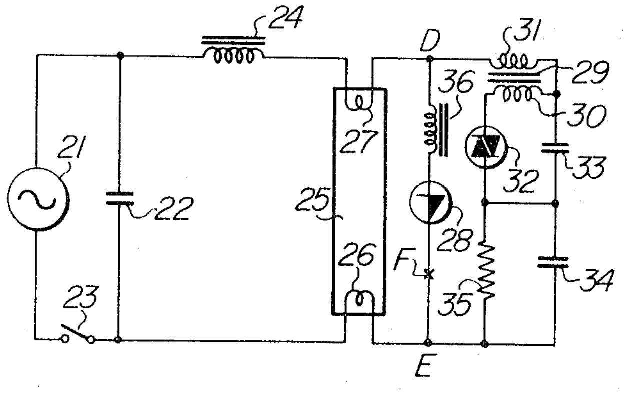
Figure 13:
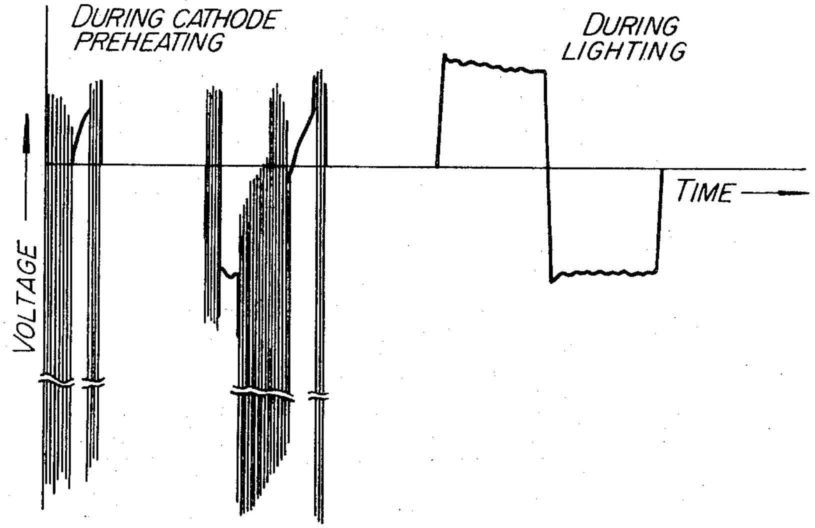
Figure 14:
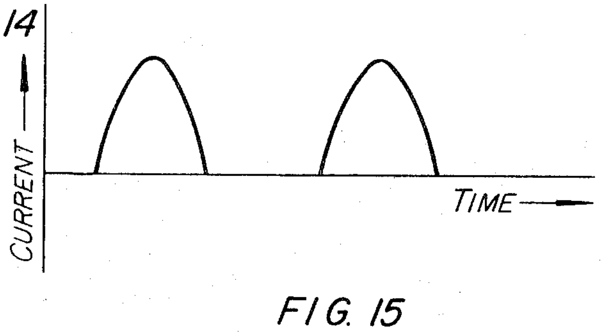
Figure 15:
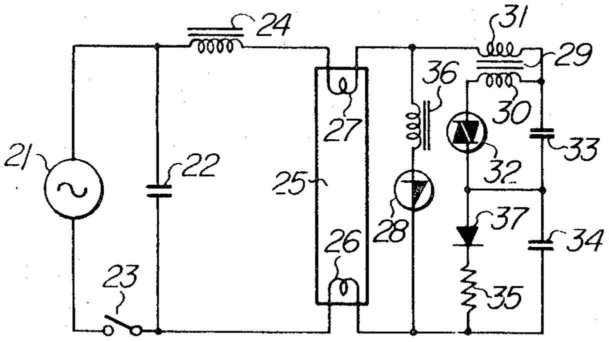
Figure 15A:
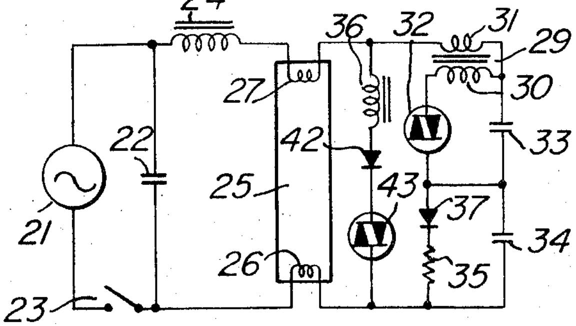

FIGS. 9 and 9*a* show in block diagram the electric circuit of the discharge lamp starter device according to another embodiment of the present invention;

FIG. 10 is a graph illustrating the waveform of the voltage applied across the points D and E in the starter device of FIG. 9 during the cathode preheating;

FIG. 11 is a graph illustrating the waveform of the current passing through the reverse blocking diode thyristor or through the point F in the FIG. 9 device during the cathode preheating;

FIGS. 12 and 12*a* show in block diagram the electric circuit of the discharge lamp starter device according to still another embodiment of the present invention;

FIG. 13 is a graph illustrating the waveform of the voltage applied across the points D and E in the starter device of FIG. 12 during the cathode preheating;

FIG. 14 is a graph illustrating the waveform of the current passing through the reverse blocking diode thyristor or through the point F in the FIG. 12 device during the cathode preheating; and FIGS. 15 and 15*a* show in block diagram the electric circuit of the discharge lamp starter device according to yet another embodiment of the present invention.

An embodiment of the present invention will now be described in detail with reference to FIGS. 3 to 8.

Figure 1:
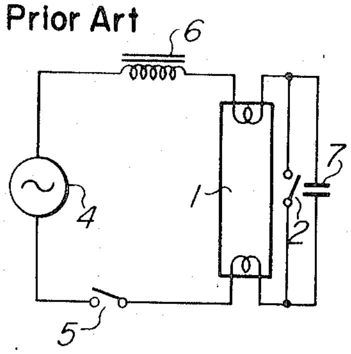
FIG. 1 Prior Art
Figure 2:
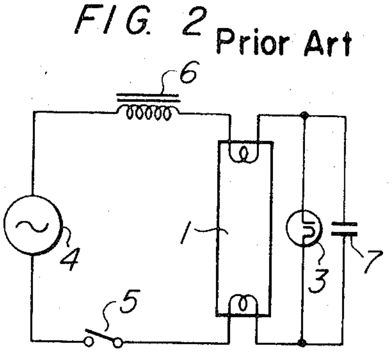
FIG. 2 Prior Art
Figure 3:
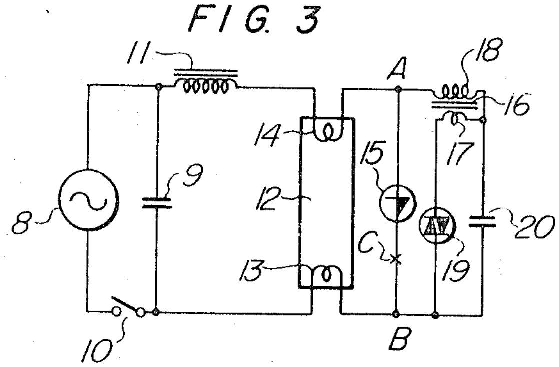

Referring to FIG. 3, the electric circuit according to an embodiment of the present invention includes an AC power source 8, a noise preventing capacitor 9, a power switch 10, a ballast 11, a fluorescent discharge tube 12 having cathodes 13 and 14 at the opposite ends thereof, a reverse blocking diode thyristor 15, a pulse transformer 16 having a primary winding 17 and a secondary winding 18 to generate a pulse voltage, a bilateral diode thyristor 19, and a capacitor 20 for generating a pulse voltage.

In the shown circuit arrangement, the AC power source 8 with which the noise-preventing capacitor 9 is connected in parallel has one end thereof connected through the power switch 10 with one end of the cathode 13 disposed at one end of the fluorescent discharge tube 12. The other end of the power source 8 is connected through the ballast 11 with one end of the cathode 14 disposed at the other end of the discharge tube 12. The reverse blocking diode thyristor 15 is connected between the other ends of the respective cathodes 13 and 14 disposed at the opposite ends of the discharge tube 12. The said other end of the cathode 14 is connected with one end of the secondary winding 18 of the pulse transformer 16. The other end of the secondary winding 18 of the pulse transformer 16 is connected with one end of the primary winding 17 in the same direction. Between the other end of the primary winding 17 and the other end of the cathode 13 of the fluorescent discharge tube 12 there is inserted the bilateral diode thyristor 19, and between the said one end of the primary winding 17 and the said other end of the cathode 13 there is inserted the capacitor 20.

Figure 4:
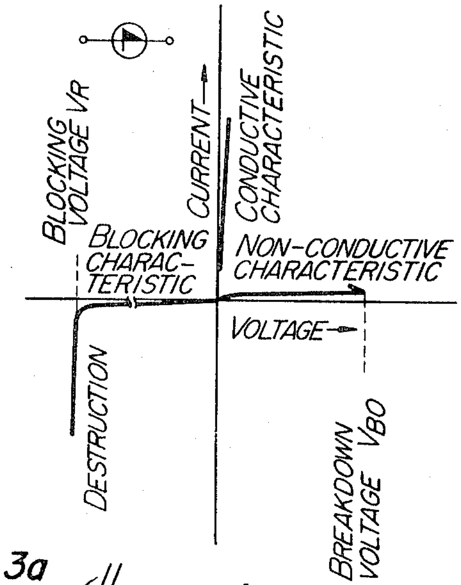
FIG. 4 is a graph illustrating the voltage-current characteristic of the reverse blocking diode thyristor used with the starter device of FIG. 3.

While the pulse transformer 16, bilateral diode thyristor 19 and capacitor 20 together constitute a known pulse generator circuit, it should be noted that in parallel therewith or between the said one end of the secondary winding 18 of the pulse transformer 16 and the connection point between the thyristor 19 and the capacitor 20 there is connected the reverse blocking diode thyristor 15 which constitutes a cathode preheating current circuit. As shown in the graph of FIG. 4, the reverse blocking diode thyristor 15 is of such a switching characteristic that it sharply changes over from its nonconductive state into its conductive state when a predetermined voltage (hereinafter referred to as "breakdown voltage $V_{BO}$") is reached. The breakdown voltage $V_{BO}$ of the reverse blocking diode thyristor used with the present invention satisfies the relation that the rated output voltage of the power source 8 > the breakdown voltage $V_{BO}$ > the terminal voltage of the discharge tube 12, while it also satisfies the relation that the blocking voltage $V_R$ >> the rated output voltage of the power source 8. Further, as shown in FIG. 5, the bilateral diode thyristor 19 is of the same characteristic as the aforesaid reverse blocking diode thyristor 15 although it lacks the actual blocking characteristic, and the breakdown voltage $V_{BO}$ of the bilateral diode thyristor 19 also satisfies the aforesaid relations.

Figures 6, 7:
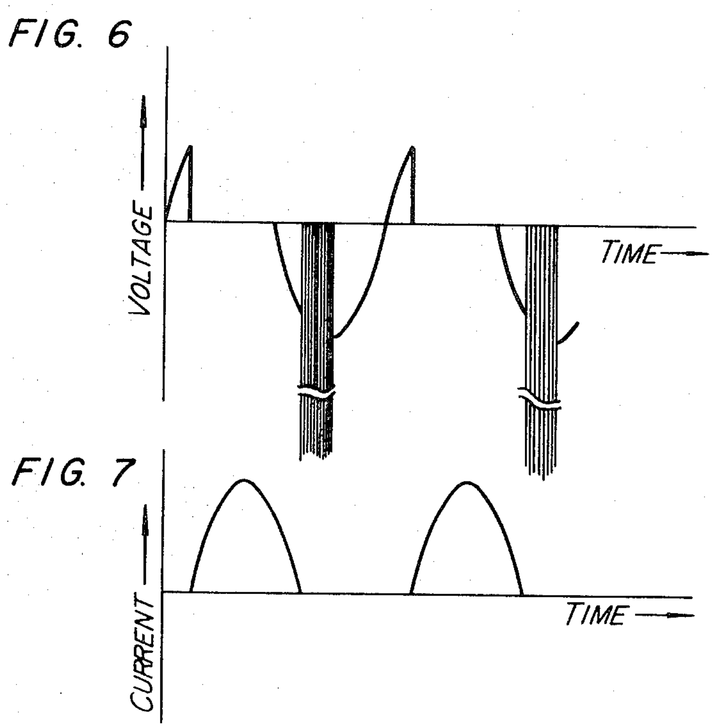
FIG. 6 is a graph illustrating the waveform of the voltage applied across the points A and B in the same device during the cathode preheating.
FIG. 7 is a graph illustrating the waveform of the current passing through the reverse blocking diode thyristor or through the point C during the cathode preheating.

Description will now be made of the operation of the above-described electric circuit. In the circuit arrangement of FIG. 3, when the power switch 10 is closed to turn on the circuit, a voltage higher than the breakdown voltage $V_{BO}$ of the reverse blocking diode thyristor 15, i.e., the rated output voltage of the power source 8 is applied across the points A and B through the ballast 11 and the cathodes 13 and 14 of the fluorescent discharge tube 12, whereby the reverse blocking diode thyristor 15 breaks down to render the circuit conductive during a positive half-wave period. Thus, a preheating current flows through the ballast 11 to the cathode 14, reverse blocking diode thyristor 15 and cathode 13. When the current becomes lower than the holding current of the reverse blocking diode thyristor 15, the circuit shifts from the conductive state into the nonconductive state. Thereupon, in the pulse voltage generator circuit the breakdown voltage $V_{BO}$ of the bilateral diode thyristor 19 is selected at a level substantially equal to the breakdown voltage $V_{BO}$ of the reverse blocking diode thyristor 15 and, when the charging voltage of the capacitor 20 exceeds the breakdown voltage $V_{BO}$ of the bilateral diode thyristor 19, the capacitor 20 discharge a current to thereby produce pulses. Nevertheless, the pulse voltage is not sufficiently applied to the cathodes 13 and 14 of the discharge tube 12 because the preheating circuit is in the conductive state. Subsequently, during a negative half-wave period, the source voltage is applied to the reverse blocking diode thyristor 15 in the same circuit, whereas the reverse blocking diode thyristor maintains its blocking state because the blocking voltage $V_R$ of the opposite characteristic is sufficiently higher than the power source. Thereupon, the aforesaid source voltage is applied to the pulse generator circuit which in turn charges the capacitor 20 through the secondary winding 18 of the pulse transformer 16. When the charging voltage exceeds the breakdown voltage $V_{BO}$ of the bilateral diode thyristor 19, there is formed a closed circuit including the primary winding 17 of the pulse transformer 16 so that a pulse voltage is produced in the secondary winding 18 of the pulse transformer 16 by the current discharged from the capacitor 20 and the pulse voltage thus produced is applied across the points A and B. The waveforms of the voltage and current during the above-described cycle are illustrated in FIGS. 6 and 7 respectively. Consequently the discharge tube 12 is quickly started. Most of the preheating current in the aforesaid circuit is a half-wave rectified pulsating current flowing in the reverse blocking diode thyristor 15, but since the pulsating current has a DC component superimposed thereon, the magnetic circuit of the ballast 11 approaches a saturation and thereby the cathodes 13 and 14 can be sufficiently preheated. After the lamp is turned on, the breakdown voltages $V_{BO}$ of the reverse blocking diode thyristor 15 and bilateral diode thyristor 19 are sufficiently higher than the terminal voltage of the fluorescent discharge tube 12 so that the cathode preheating circuit maintains its nonconductive state.

Figure 5:
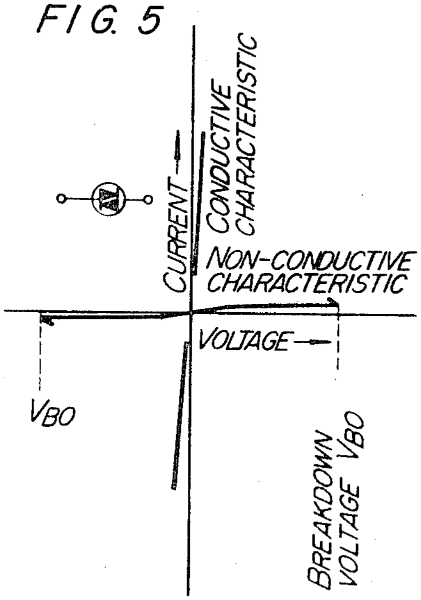
FIG. 5 is a graph illustrating the voltage-current characteristic of the bilateral diode thyristor used with the starter device of FIG. 3.
Figure 3A:
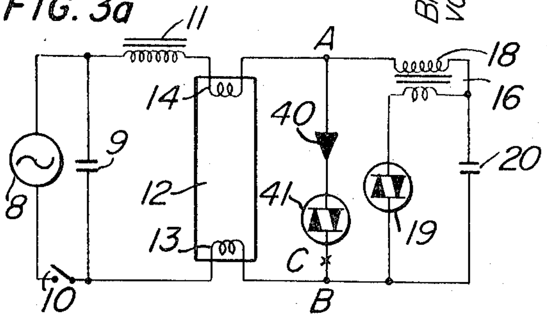
Figure 8:
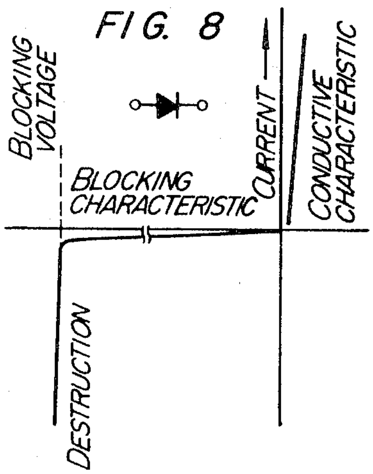
FIG. 8 is a graph illustrating the voltage-current characteristic of the diode used to provide the reverse blocking diode thyristor as shown in FIG. 4.

The reverse blocking diode thyristor 15 used in the cathode preheating circuit may be provided, as shown in FIG. 3*a*, by connecting a bilateral diode thyristor 41 as shown in FIG. 5 in series with a diode 40 whose blocking voltage $V_R$ is sufficiently higher than the rated source voltage as shown in FIG. 8. In FIGS. 3 and 3*a*, one end of the secondary winding 18 of the pulse transformer 16 and the connection point between the bilateral diode thyristor 19 and capacitor 20 are connected with the other ends of the cathodes 14 and 13, respectively, whereas this is not the only possible way of connection but the connection may be with either ends of the cathodes 14 and 13.

Modified electric circuits according to the present invention will now be described with respect to FIGS. 9 to 15. FIG. 9 shows an electric circuit including an AC power source 21, a noise-preventing capacitor 22, a power switch 23, a ballast 24, a fluorescent discharge tube 25 having cathodes 26 and 27 disposed at the opposite ends thereof, a reverse blocking diode thyristor 28, a pulse transformer 29 having a primary winding 30 and a secondary winding 31, a bilateral diode thyristor 32, and a capacitor 33 for generating a pulse voltage. The circuit further includes a capacitor 34 for effectively applying a pulse voltage across the points D and E which are the opposite ends of the reverse blocking diode thyristor 28 and for resonating with the ballast 24 during the operation of the bilateral diode thyristor 32 so as to increase the voltage across the points D and E to thereby contribute to improving the starting characteristic of the discharge lamp. There is also included a resistor 35 for controlling the charging voltage of the capacitor 34 and the phase thereof during the turn-on of the lamp so as to prevent any malfunction of the bilateral diode thyristor 32. In the modified circuit arrangement of FIG. 9, the AC power source 21 connected in parallel with the noise-preventing capacitor 22 has one end thereof connected through the power switch 23 with one end of the cathode 26 disposed at one end of the fluorescent discharge tube 25. The other end of the power source 21 is connected through the ballast 24 with one end of the other cathode 27 of the discharge tube 25. The reverse blocking diode thyristor 28 is connected between the other ends of the respective cathodes 26 and 27 of the discharge tube 25, and the said other end of the cathode 27 is also connected with one end of the secondary winding 31 of the pulse transformer 29. The other end of the secondary winding 31 of the pulse transformer 29 is connected with one end of the primary winding 30 in the same direction, and between the opposite ends of the primary winding 30 there is connected a serial circuit of the bilateral diode thyristor 32 and capacitor 33. A parallel circuit constituted by the capacitor 34 and resistor 35 is inserted between the connection point between the thyristor 32 and capacitor 33 and the said other end of the cathode 26 of the fluorescent discharge tube 25.

In operation, when the power switch 23 is closed, a voltage higher than the breakdown voltage $V_{BO}$ of the reverse blocking diode thyristor 28, that is, the rated output voltage of the power source 21 is applied across the points D and E through the ballast 24 and fluorescent discharge tube 25 so that the reverse blocking diode thyristor 28 breaks down to render the circuit conductive. Thus, a sufficient, half-wave rectified cathode preheating current as shown in the graph of FIG. 11 flows in the cathodes 26 and 27 of the fluorescent discharge tube 25. If, at this time, the breakdown voltage $V_{BO}$ of the bilateral diode thyristor 32 is selected at the same value as the breakdown voltage $V_{BO}$ of the reverse blocking diode thyristor 28, then the capacitor 33 is charged through the capacitor 34, resistor 35 and secondary winding 31 of the pulse transformer 29. When this charging voltage exceeds the breakdown voltage $V_{BO}$ of the thyristor 32, the current discharged from the capacitor 33 flows in the closed circuit including the primary winding 30 of the pulse transformer 29 so that a pulse voltage is produced in the secondary winding 31 of the pulse transformer 29, and the voltage thus produced is applied across the points D and E through the capacitor 34 and resistor 35. Thereupon the reverse blocking diode thyristor 28 causes a cathode preheating current to flow when a positive potential appears at the point D, and the same thyristor 28 causes a pulse voltage to be superimposed on the resonance voltages of the capacitor 34 and ballast 24 when a positive potential appears at the point E. Thus, a voltage as shown in FIG. 10 is applied across the cathodes 26 and 27 to quickly start the fluorescent discharge tube 25.

FIG. 12 shows an improved embodiment based on the FIG. 9 embodiment and like parts are indicated by like numerals. As shown, a blocking coil 36 connected in series with the reverse blocking diode thyristor 28 is inserted between the points D and E, whereby a backward leakage current flows through the reverse blocking diode thyristor 28 due to the backward voltage characteristic thereof when a pulse voltage appears, and this current absorbs the high-voltage pulse energy. As the result, the starting voltage of the fluorescent discharge tube 25 is reduced to prevent the starting characteristic thereof from being injured. Thus, with respect to the power source 21, the action of the blocking coil 36 shows a sufficiently low impedance which does not affect the cathode preheating current, while with respect to a pulse voltage accompanying a high-frequency vibration produced by the pulse transformer 29, the blocking coil 36 has a sufficiently high impedance. In other words, the blocking coil 36 compensates for the backward voltage characteristic of the reverse blocking diode thyristor 28 so that substantially the whole of the pulse voltage is blocked. This enables the reverse blocking diode thyristor 28 to be used even if its backward withstand voltage is low, and this also serves to improve the stability of the starting characteristic and reliability of the starting elements in the discharge lamp starter device. The arrangement and operation of the other portion of the electric circuit of FIG. 12 is identical with those described with respect to FIG. 9. Thus, as is shown in FIG. 13, the waveform of the starting voltage applied across the points D and E during the cathode preheating has much more pulses than that in FIG. 10, and its increased energy serves to improve the starting characteristic. FIG. 14 shows the waveform of the cathode heating current in this instance.

FIG. 15 shows a further improved circuit than the FIG. 12 embodiment, and like parts are indicated by like numerals. In this improved embodiment, a diode 37 is inserted in series with the resistor 35 for controlling the charging voltage of the capacitor 34 and the phase thereof so as to improve the stability and starting characteristic of the circuit. In other words, the resistor 35 serves to prevent any malfunction of the thyristor 32 by controlling the charging voltage of the capacitor 34 and the phase thereof, and as the resistance value of the resistor 35 is smaller, the stability of the circuit is more improved while the performance of the capacitor 34 is reduced to decrease its resonance with the ballast 24 and aggravate the starting characteristic of the circuit. It is in this context that the diode 37 is used. During the starting operation or when a positive potential appears at the point E, the backward characteristic of the diode 37 serves to increase the resistance value of the resistor 35 equivalently and thereby increase the resonance between the capacitor 34 and the ballast 24 so as to enhance the starting characteristic. When the discharge tube is lit up, the forward characteristic of the diode 37 causes the capacitor 34 to quickly discharge the voltage stored therein and thereby prevent any malfunction of the thyristor 32 so as to provide the circuit with high stability. During the starting operation this increases the pulse voltage energy as well as the resonance between the capacitor 34 and the ballast 24, thus resulting in an increased cathode heating current which will ensure the smooth start of the fluorescent discharge tube irrespective of low or high temperature conditions. Moreover, any unstable operation such as the failure to start or flickering phenomenon which might result from the malfunction of the thyristor 28 can be sufficiently prevented by the diode 37 and resistor 35. The arrangement and operation of the other portion of this embodiment other than the diode 37 are the same as those described with respect to FIGS. 9 and 12. The reverse blocking diode in the above embodiments, as shown in FIGS. 9, 12 and 15, may be replaced by a series connection of a diode 42 and a bilateral diode thyristor 43 as shown in FIGS. 9*a*, 12*a* and 15*a*, respectively.

As has been disclosed above, the discharge lamp starter device according to the present invention uses semiconductor elements such as reverse blocking diode thyristor, bilateral diode thyristor and diode, and this leads to a substantially permanent life of the starter device as compared with those conventional devices using a glow starter tube or the like. In addition, the present invention provides a much smaller and lighter discharge lamp starter device than those using a ballast provided with windings for heating the cathodes and applying high voltage. Furthermore, the starter device provided by the present invention can readily replace the conventional glow starter device and this means a great advantage when manufacturing parts. Also, the use of semiconductor elements ensures a very quick start of the starter device while providing a sufficient preheating current which would never injure the life of the fluorescent discharge tube. These advantages lead to a great practical value of the present invention.

What is claimed is:

1. A starting device for a discharge lamp having a pair of cathodes comprising a source circuit connected across said pair of cathodes and including a series connection of an AC power source and a ballast element, a preheating circuit connected across said pair of cathodes so as to form a loop circuit through said pair of cathodes in cooperation with said source circuit, said preheating circuit permitting a current therethrough only when a voltage higher than a predetermined value is applied across said preheating circuit in a given direction, and a starting circuit including a pulse transformer whose secondary winding is connected in parallel with said preheating circuit through a first capacitor and whose primary winding is connected in parallel with said first capacitor through a bilateral diode.

2. A starting device according to claim 1, wherein said preheating circuit includes a reverse block diode thyristor connected across said pair of cathodes.

3. A starting device according to claim 1, wherein said preheating circuit includes a series connection of a bilateral diode thyristor and a diode, said series connection being connected across said pair of cathodes.

4. A starting device according to claim 1, wherein said secondary winding of said pulse transformer is connected in parallel with said preheating circuit through said first capacitor and through a parallel circuit including a second capacitor and a resistor connected in parallel with said second capacitor.

5. A starting device according to claim 4, wherein said preheating circuit includes a reverse blocking diode thyristor connected across said pair of diodes.

6. A starting device according to claim 4, wherein said preheating circuit includes a reverse blocking diode thyristor connected across said pair of cathodes through a blocking coil.

7. A starting device according to claim 6, wherein said parallel circuit further includes a diode connected in series with said resistor and in parallel with said second capacitor.

8. A starting device according to claim 4, wherein said preheating circuit includes a series connection of a bilateral diode thyristor and a diode, said series connection being connected across said pair of cathodes.

9. A starting device according to claim 4, wherein said preheating circuit includes a series connection of a bilateral diode thyristor, a diode and a blocking coil, said series connection being connected across said pair of cathodes.

10. A starting device according to claim 9, wherein said parallel circuit further includes a diode connected in series with said resistor and in parallel with said second capacitor.

* * * * *